United States Patent [19]

Yee

[11] Patent Number: 4,894,789

[45] Date of Patent: Jan. 16, 1990

[54] TV DATA CAPTURE DEVICE

[76] Inventor: Keen Y. Yee, 57 Ogden Ave., White Plains, N.Y. 10605

[21] Appl. No.: 158,592

[22] Filed: Feb. 22, 1988

[51] Int. Cl.$^4$ ............................................. H04N 7/10
[52] U.S. Cl. ..................................... 364/521; 358/86; 358/91; 455/4
[58] Field of Search ....................... 364/518, 521, 522; 358/84, 86, 91, 92, 93, 94, 296, 301; 360/5; 369/48, 49, 83; 455/3, 4

[56] References Cited

U.S. PATENT DOCUMENTS

| | | | |
|---|---|---|---|
| 4,367,548 | 1/1983 | Cotten, Jr. et al. | 358/86 X |
| 4,367,557 | 1/1983 | Stern et al. | 358/86 |
| 4,395,780 | 7/1983 | Gohm et al. | 358/86 X |
| 4,695,880 | 7/1987 | Johnson et al. | 358/86 |
| 4,734,764 | 3/1988 | Pocock et al. | 358/86 |

Primary Examiner—Gary V. Harkcom
Assistant Examiner—H. R. Herndon

[57] ABSTRACT

A tv capture device is described which is incorporated with a conventional tv set or monitor. The data capture device extracts digital data from a composite video-digital signal and allows one to selectively store, retrieve stored information, and display the information on a tv screen or monitor. The apparatus includes a digital data extractor for extracting the digital data from the composite video signal, a memory unit, a permanent storage unit, and a microprocessor for receiving the extracted digital data. The microprocessor is controlled by a remote control device enabling information to be stored and retrieved from storage for display on a tv screen. A digital-video converter is used to convert the extracted digital data to video signals to simultaneously display the extracted digital data with the currently transmitted program.

14 Claims, 1 Drawing Sheet

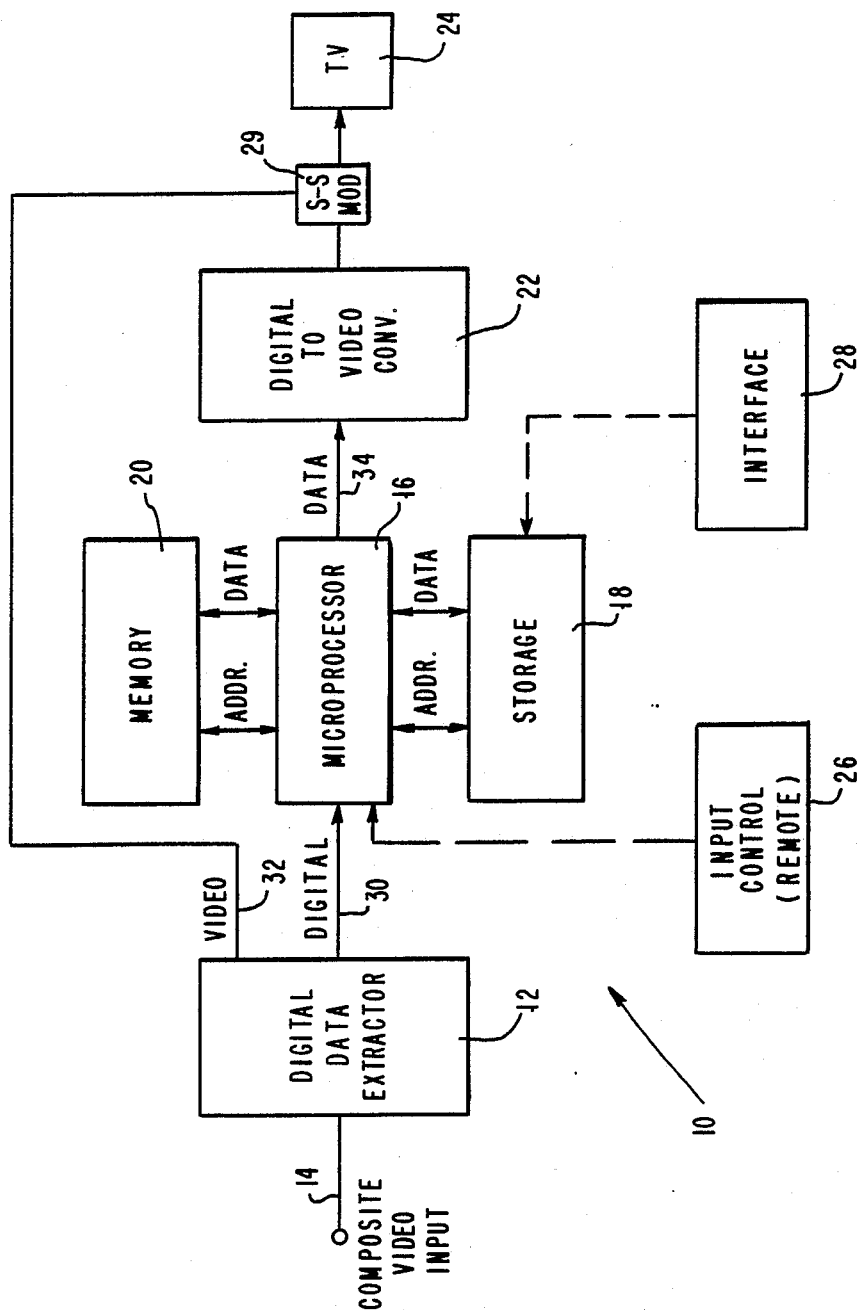

TV DATA CAPTURE DEVICE

DESCRIPTION

1. Field of the Invention

This invention relates to a TV data capture device which allows the capture and display of digital data sent with video signals, and more particularly to such a device wherein the digital data can be stored and retrieved selectively enabling its display on the TV screen as desired.

2. Background Art

It is well known that many services are provided which enable users to display on screen digital data provided to subscribers. For example, subscribers can receive services related to business and stock market quotations, where the stock market prices are transmitted over telephone lines and are received by a modem at the subscriber's terminal. Having a computer and keyboard entry device enables the subscriber to selectively access digital data which is sent over the telephone lines in order to display this data on the computer screen.

Many services of the type described in the previous paragraph are available, except that the expense of the service is not trivial. Also, the subscriber generally has to have a computer and a modem in order to be able to fully participate in the range of services offered to the subscribers.

Many tv channels transmit programs including digital data for the purpose of close-captioning. The digital data is transmitted with the video signals and is stored in the vertical blanking interval (VBI). This data can be extracted using a decoder which then re-integrates the translated digital data to a regular video signal that can be displayed on the tv screen. This displays the captions on the screen simultaneously with the video picture.

In more detail, an existing system is a teletext system authorized by the FCC in lines 10–18 of the transmission band. Teletext is a one way data transmission system that is sent out as part of a tv signal, whether the signal is sent out via satellite, cable, or regular broadcast tv. This teletext information is available free of charge to viewers, in contrast with the digital data sent to subscribers of various services of the type mentioned hereinabove. There are many types of teletext services being offered at this time covering topics such as cultural affairs, home and catalog shopping, sports, news, financial information, weather, and other types of statistics. Such teletext information is regularly offered by the major networks.

As noted, teletext and graphics are transmitted as digital data squeezed into a broadcast television signal in the vertical blanking interval. This interval is the time at the end of each television field when the cathode-ray beam is cut off while it returns to start the next field. The VBI is also used for the transmission of information other than teletext information. Such other uses include closed-captioned information, automatic color-balance information and broadcast test data. Teletext is sent as an endless loop of pages where the data for the pages are transmitted serially at the rate of 13,500 bits per second per VBI line used. The total rate of transmission is dependent upon the number of lines (up to 8) used to transmit the data.

At the user end, a decoder is used to convert the teletext data to a regular video signal that can be displayed on a tv screen. Any of the pages in the loop can be accessed at random. However, because an endless-loop format is used, it takes time for each page to come around in the loop. This means that there is a slight delay between the time the page number is entered and the time that the page actually appears on the tv screen. In turn, this imposes a practical limit to the number of pages that a teletext service can offer. One way to alleviate this delay is to transmit the more important pages of information more than once within the endless loop, so that these pages will come up faster. For example, indices are transmitted several times in the loop, since these pages are more important to the users.

When using teletext, it is not possible to access any page of information without the attendant delay in being able to extract and display the digital information. Further, there is no provision for permanently storing a page of information that is interesting to the user. Rather, the endless loop of information is continuously updated and is often changed so that a desired page is no longer part of the loop of information that is transmitted. Since the presently available teletext decoders are rather expensive and further since the ease of extracting information is limited, such systems have not found great popularity. On the other hand, the online services, while solving many of the teletext services problems, require expensive equipment and are expensive due to their high subscription rates.

Accordingly, it is an object of the present invention to provide an inexpensive apparatus for use with conventional tv sets which will economically enable consumers to utilize the digital data sent with video signals.

It is another object of the present invention to provide a system for use with a conventional tv set which enables one to extract and use digital data sent with tv signals in a manner wherein such information can be extracted, permanently stored, and retrieved for display on a tv screen at any time.

It is another object of the present invention to provide an apparatus enabling the ready extraction, storage, and retrieval for display on a tv screen of digital data sent along with video signals, where the restrictions of an endless-loop format are overcome.

It is another object of this invention to provide an apparatus for extracting and storing digital data sent along with video signals, where the updating of the digital data sent with the video signal does not preclude the display on the tv screen of digital data which is no longer being transmitted with the video signals.

It is another object of this invention to provide a system enabling expanded use of a conventional tv set wherein digital data sent with the tv signal can be selectively accessed and displayed on the tv screen.

BRIEF SUMMARY OF THE INVENTION

This tv data capture device can be incorporated within a conventional tv and monitor, or can be a separate component linked to the tv set or monitor via coax cables. This data capture device enables the extraction, storage, and retrieval of digital data from a composite signal including both digital data and video data, where the digital data can be extracted and displayed on the tv screen or monitor.

The data capture device uses some components that are similar to a close-captioned decoder or a teletext decoder. The basic system is comprised of a digital data extractor circuit which is an integrated circuit for this purpose and which extracts the digital data from the incoming video signals, a microprocessor which receives the digital data, interprets it, and then stores it in permanent storage, a RAM/ROM memory unit to contain the software for processing the extracted digital data, and a digital-to-video converter which transforms the extracted digital data for display on a tv monitor. The amount of memory required in the RAM/ROM component is determined by the sophistication of the software, as is well known in the art, and will vary depending upon the number of functions that are provided in the data capture device. The permanent storage component can be comprised of diskettes or a hard disk, the amount of storage depending upon the quantity of digital data to be permanently stored.

A remote control device, such as a keyboard, can be connected to the microprocessor to serve as an input device for communicating with the tv data capture device in order to instruct it to capture and store or to retrieve the stored information. As noted, this remote control device can be a keyboard equipped with alphanumeric keys to allow for sophisticated retrieval instructions to access the stored database of information. However, the remote control device can be very simple, as for example it may even be the normal tv remote control channel selecting device, such as one which operates with infrared signals.

An interface unit can optionally be provided that interacts with the permanent storage in order to connect the data capture device to a personal computer for more sophisticated users.

If the data being transmitted is totally digital, the digital data extractor circuit can be omitted, but preferrably will provide a bypass route directly to the microprocessor if only digital data is being transmitted.

These and other objects, features, and advantages will be apparent from the following more particular description of the preferred embodiments.

DESCRIPTION OF THE DRAWING

The FIGURE shows a schematic block diagram of a tv data capture device in accordance with the present invention, indicating the components of the device and the flow of digital and video signals.

DETAILED DESCRIPTIOM

A block diagram of this tv data capture device is shown in the FIGURE. Device 10 is generally comprised of a digital data extractor circuit 12 for extracting digital data from a composite video input appearing on line 14, a microprocessor 16 which receives the digital data, interprets it, and then stores it in permanent storage 18. Also included in data capture device 10 is a memory circuit 20 including a read only memory (ROM) and a random access memory (RAM) for containing software required to process the extracted digital data. A digital-video converter 22 is used for transforming extracted digital data for display on a tv monitor 24. A remote control device 26 can be connected to the microprocessor 16 to serve as an input device for instructing the capture and storage, or retrieval of stored digital information. An interface circuit 28 is optionally included for connecting the tv data capture device 10 to an external computer (not shown). A signal switcher and modulator circuit 29 is provided so that both tv pictures (video signals) and extracted digital data can be simultaneously displayed on the TV screen. If this feature is not necessary, circuit 29 can be omitted and, in this situation, the video signals and extracted digital data would be sent directly to the tv 24, but at different times.

The composite video signal includes both video and digital data. Some sources of a composite signal are a VCR, a component tv tuner, or a satellite tv receiver. Many new tv sets even have composite outputs from the tuner as well as direct video and audio inputs. With such a tv, no separate tuner is necessary. In the absence of a source of composite signals, the data capture device 10 can be implemented by tapping the appropriate points inside an existing tv set.

In operation, the digital data extractor circuit 12 is activated to extract digital data from the composite video input signal on line 14. The extracted digital data is set to microprocessor 16 on line 30, while the video signal on line 32 is sent directly to the signal switches and modulator circuit 29. The extracted digital data is sent either to permanent storage 18 or to the memory 20. Memory 20 contains the software required to operate the data capture device 10 to allow digital data to be either permanently stored in storage 18 or to be accessed for display on the tv 24. Thus, conducting cables are provided for the data addresses and for the data between memory 20 and microprocessor 16, as well as between the microprocessor and the permanent storage 18. Data retrieved from memory or storage is applied to the digital-video converter 22 via line 34. The digital-video converter 22 converts the extracted digital signals to video signals for display on the tv or monitor 24. This digital data can be displayed on one of the unused TV channels in a full-screen mode. An alternate mode of display would utilize a signal switching and modulator circuit that would recombine the retrieved digital data from converter 22 with the video signals currently being transmitted on line 32 so that the digital data can be displayed on the TV 24 without interrupting the current program. Digital data retrieved and displayed in this alternate mode may be selectively displayed in as many lines as desired, and will be superimposed onto the screen of the program currently being transmitted and displayed.

The various components shown in the FIGURE well known in the art, and are commercially available. The invention herein is the utilization of these components in a unique way to enable the consumer to expand the use of his or her tv set in a manner to allow digital data to be extracted and selectively stored, retrieved, and displayed on the tv screen. The software for such a purpose is also well known, and is software typically used to store, retrieve, and display data, regardless of the source of that data.

As noted, the circuitry used to implement the various components shown in the FIGURE are well known, and for a more detailed discussion of that type of circuitry, reference is made to an article by J. Daniel Gifford, which appeared in Radio-Electronics, pages 45–49, April 1986. This article describes teletext decoders for extracting digital data from a composite video signal, as well as suitable remote control devices and signal switchers and modulators used to enable a tv set to display both tv pictures and teletext data at the same time. Generally, audio and video buffers are also conventionally used to provide signals of the proper level and polarity to the data extractor and output circuitry. These buffers also protect the data extractor against excessive voltages. The audio signal does not have a part in the operation of the digital extractor, but an audio input can be provided so that it can be modulated on the RF output of the circuit used to enable simultaneous display of the video signals and digital data that is selected from the permanent storage component 18. Of course, the audio connection can be made directly from the tuner of the tv set to the monitor (display screen) if the decoder's composite video output is used.

The remote control unit 26 interacts with the microprocessor 16 to provide inputs enabling the selection and display of digital data that is in permanent storage 18. If desired, a wireless (infrared) remote control circuit can be used of the type described in the aforementioned Gifford article (see FIGS. 8 and 9 thereof).

In contrast with conventional teletext decoding systems, the data capture device of this invention provides means for selectively storing, retrieving, and displaying digital data on a tv screen. This allows the consumer to avoid the problems associated with the endless loop transmission of digital data in a composite video-digital input. It also allows the consumer to store digital data for later use even though the data is no longer part of the endless-loop format for the transmitted data. Further, the consumer does not have to purchase a computing system and pay for the specialized on-line services in order to have more extensive use of the digital data presently being transmitted in the vertical blanking interval of the video signal that is received by his or her tv set.

The data capture device of this invention can be applied to enhance existing tv networks and on-line information systems, such as the Dow Jones System. Existing tv networks such as cable shopping and weather stations can enhance their value and attraction to the consumer by enabling their channels for use by the present tv data capture device. This is a rather inexpensive investment for the tv networks, since they merely have to mix digital data into their video signals. For instance, a cable shopping network could transmit digital data to record the catalog number of the merchandise they are selling, together with the cost and the repeat airing time of this merchandise. The consumer at the receiving end watching the show can store this information in permanent storage unit 18, together with several items of interest. At a later time the consumer may recall the data stored by item, e.g., lamp, clothes etc. and view and select the items to purchase at the viewer's convenience. If the viewer requires a second look at the merchandise he or she can wait for the next showing as indicated on the stored record.

In the case of weather stations (weather information does not suffer from a lack of visual data), the network can again transmit digital data alongside the regular video transmission. The receiving consumer stores the digital information in permanent storage unit 18 and can then selectively view the weather data accessed by town, region etc. The type of storage and the data base used are well known in the art, so that any type of classification can be used when storing data.

Similarly, the use of on-line tv guides can also be enhanced. Transmission of digital data will use the Line-21 System in most cases. For on-line information systems such as Dow Jones, the World System Teletext (WST) or the North American Broadcast Teletext (NABTS) formats are more useful transmission modes since a higher baud-rate will be desirable. The effective baud-rate of the Line-21 System is 510 bits per second, which is rather slow but is sufficient when the data sent is to accompany the currently viewed program. For large volume data transmission, the WST system offers a 5.7 megabaud rate, utilizing lines 10–18 of the vertical blanking interval. This contrasts to the former system which uses only line 21 of the interval.

Talk shows, documentaries, and educational programs that are enabled for data capture can be stored inexpensively for later reference. This is a helpful feature for handicapped individuals such as those whose hearing is impaired.

As noted, existing teletext systems allow random access to information transmitted by requiring the sender to repeatedly transmit the same batch of information, and consequently the endless loop format is used. A teletext decoder locates the page or record requested by the user by scanning the repeating loop of information transmitted, and then displaying the information on the tv screen. This places a physical limitation on the amount of information that the sender can send while still attaining a reasonable response time for the user when the information is selected. This limit is in the region of about 100-200 pages of information. In contrast with this, the tv data capture device of the present invention places no limitation on the amount of information the sender can transmit, and does not require a repetition of information transmission. The only limitation is at the receiving end, and relates to whether or not the user has bought a unit with sufficient memory and storage for storing whatever information the user has selectively captured from the transmission.

The tv data capture device of this invention offers tv stations the capability of selling a much cheaper form of advertising airing time. This is equivalent to classified advertising in newspapers, but makes it available to consumers on-line. It also makes possible the computerization of advertising such as that contained in the yellow pages of the telephone directories. If the WST or NABTS format is used for data transmission, even graphical data can be transmitted and displayed using the tv data capture device.

The various components of the data capture device 10 can be individual circuits connected as shown in a separate box used together with a conventional tv set or monitor, or can be a portion of a personal computer. In this latter arrangement, some of the components of the data capture device 10 are located on an integrated circuit card that uses one of the slots in a personal computer system board. The card would include the digital data extractor 12, the digital to video converter 22, the signal switcher and modulator 29, and an input terminal line 14 for receiving the composite video/digital input signal. The microprocessor 16, storage 18 and memory 20 would be those components already present in the PC. The PC keyboard would be used for input of instructions. The extracted digital data can be directly displayed on the PC screen. In this alternative arrangement, the signal switcher and modulator 29 could be eliminated if the video signals are directly sent to the TV screen or monitor while the extracted digital data is displayed on the PC screen. This alternate version can be utilized by PC users and owners who can take advantage of the PC and explore more sophisticated processing on the extracted digital data.

In contrast with existing subscriber systems, the present system offers many advantages and the capability of economically using both video and digital data. For example, existing systems which may receive both video and digital data require the aforementioned endless loop format, while those that do not use this format receive only digital data through an expensive computer link-up operation. Instead of this, the invention herein can receive and process both video and digital data, without the need for an endless loop format and at low cost.

The data captive device of this invention is useful to end users, TV manufacturers, computer manufacturers, and service suppliers. The end user can use the DCD to improve existing equipment, i.e., to provide a new function using a DCD box or card. The manufacturers can use the DCD to upgrade their products (TV's or computers) to provide this new function, while the service supplier (such as a cable company) can provide DCD service to its existing subscribers.

While the invention has been shown with reference to particular embodiments thereof, it will be appreciated by those of skill in the art that variations may be made therein without departing from the spirit and scope of the present invention. This invention is broadly an apparatus for capturing and recording of teletext or videotext data and for later processing of that data, ranging from simple data retrieval to computer programmed processing when the data capture device is attached to a computer. This allows the user to selectively store, retrieve, and display any of the digital data transmitted with the video signal, thereby extending the enjoyment and utility of the consumer's tv set.

Having thus described my invention what I claim as new and desire to secure as Letters Patent, is:

1. A digital data capture apparatus used by a receiving party and operating in combination with a receiving tv set or monitor, comprising:
   a tv set or monitor,
   means associated with said tv set or monitor for receiving a composite video-digital signal, said signal including digital data having no addresses associated therewith,
   an extraction circuit enabling the receiving party to extract selected digital data from said composite signal,
   storage means for storing said selected digital data under control of instructions directed to a microprocessor,
   memory means communicating with said microprocessor for storing programs, said selected digital data, and addresses therefor,
   a microprocessor for receiving said selected digital data from said extraction circuit, said microprocessor communicating with said memory means and with said storage means for controlling the selected storage, retrieval, and display of said selected digital data, and
   a digital-to-video converter for converting said selected digital data to video signals suitable for display on the screen of said tv set or monitor.

2. The apparatus of claim 1, further including input control means communicating with said microprocessor to enable said receiving party to select the extracted digital data to be stored in said storage means and to be retrieved therefrom for display on the screen of said tv set or monitor.

3. The apparatus of claim 2, where said input control means is a remote control device communicating with said microprocessor.

4. The apparatus of claim 1, further including an interface circuit interconnecting said storage means and a computer.

5. The apparatus of claim 1, where said memory means includes a random access memory and a read only memory.

6. The apparatus of claim 1, further including a communication link between said extraction circuit and the screen of said tv set or monitor to enable the transmission of video signals from said composite signal to be continuously displayed on the screen of said tv set or monitor.

7. The apparatus of claim 1, further including a signal switcher and modulator circuit between said digital-to-video convertor and said tv set or monitor for allowing simultaneous display of digital data and said video signal.

8. A digital data capture apparatus used by a receiving party and operating in combination with a tv set or monitor, comprising:
   a tv set or monitor having associated therewith a receiving means for receiving a composite video-digital signal, said signal having no addresses associated therewith,
   an extraction circuit connected to said receiving means and enabling said receiving party to extract selected digital data from said composite signal, and
   processing means including a processor operating under control of a stored program and storage means for storing said selected digital data, said processor enabling said receiving party to selectively store said extracted digital data, retrieve selected digital data from storage, and display said selected digital data on the screen of said tv set or monitor.

9. The apparatus of claim 8, further including a digital-video converter circuit for converting said extracted digital data to video signals for simultaneous display of said digital data and said video signals on the screen of said tv set or monitor.

10. The apparatus of claim 9, including input control means for communication with said processor for enabling the selective storage, retrieval, and display of said data.

11. The apparatus of claim 10, where said processing unit includes memory means for storage of instructions for said processing unit, said memory means including a random access memory and a read only memory.

12. The apparatus of claim 8, further including signal switching and modulator means for allowing simultaneous display on said TV screen or monitor of said selected digital data and said video signal.

13. The apparatus of claim 8, further including a personal computer which provides said processor, and said storage means.

14. A digital data capture device used by a receiving party and operating in combination with a personal computer, comprising:
   a personal computer capable of receiving a composite video-digital signal, said digital signal having no addresses associated with it,
   means for delivering said composite video-digital signal to said personal computer,
   an integrated circuit card having as components therein
      an extraction circuit enabling said receiving party to extract selected digital data from said composite signal,
      a digital-to-video converter for converting said extracted digital data to video signals suitable for display on a screen of a display associated with said personal computer, storage means for storing said extracted digital data under control of instructions directed to a microprocessor, and memory means communicating with said microprocessor for storing programs, said extracted digital data and addresses thereof, and a microprocessor receiving said extracted digital data from said extraction circuit, said microprocessor communicating with said memory means and with said storage means for controlling the selected storage, retrieval, and display of said extracted digital data.

* * * * *